Feb. 5, 1952     A. MISCHKE     2,584,487
SHEET-CUTTING MACHINE HAVING A TRAVELING
CUTTER-CARRIAGE AND A MOTOR-DRIVEN
RECIPROCATING CUTTER
Filed Nov. 20, 1947
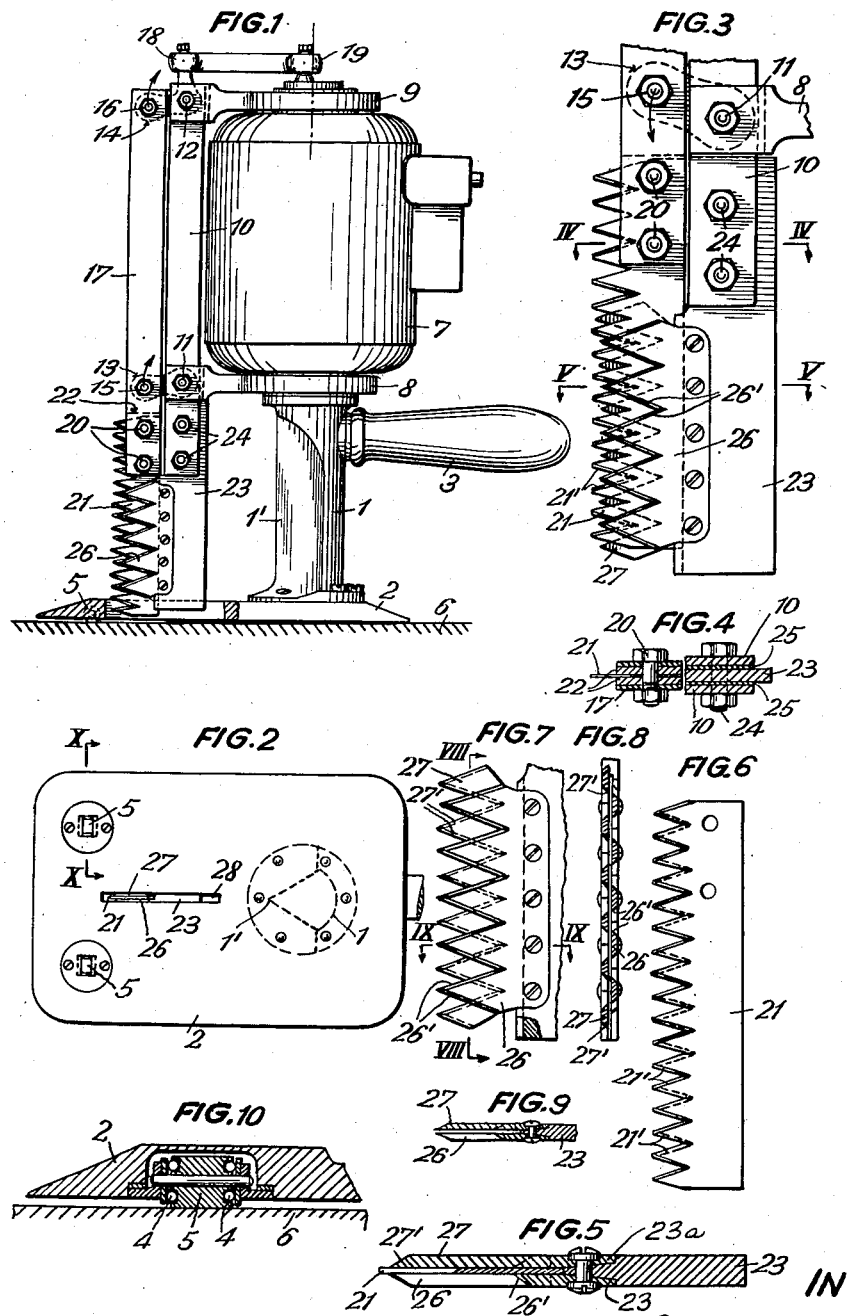
INVENTOR:
Alice Mischke
by Sommers & Young
Attorneys Patented Feb. 5, 1952

2,584,487

UNITED STATES PATENT OFFICE 2,584,487

SHEET-CUTTING MACHINE HAVING A TRAVELING CUTTER CARRIAGE AND A MOTOR-DRIVEN RECIPROCATING CUTTER

Alice Mischke, Zurich, Switzerland

Application November 20, 1947, Serial No. 787,092
In Switzerland October 9, 1947

3 Claims. (Cl. 30—219)

My present invention relates to improvements in cutting-machines in which the cutter is given a separate reciprocating cutting movement by a motor, in addition to such motion as is imparted to it by being moved about by hand over the stationary work, such as are used, e. g., in tailor or garment shops for cutting stacked fabric sheets or webs, and the main object of my improvement is to provide means which permit of positively guiding and automatically and continuously grinding or resharpening the cutter while the machine is in operation.

I attain this and related objects by the cutting machine shown, in a single form of invention, in the accompanying drawing, in which Fig. 1 shows a side view, partly in section, Fig. 2 a bottom plan view, Fig. 3, in a larger scale, the cutting gear in a side view according to Fig. 1, Fig. 4 a cross-section on line IV—IV of Fig. 3, Fig. 5, in a larger scale, a cross-section on line V—V of Fig. 3, Fig. 6 the reciprocable cutter in side view, Fig. 7 the two stationary cutters, exclusive of the reciprocable cutter.

Fig. 8 a section on line VIII—VIII of Fig. 7,

Fig. 9 a cross-section on line IX—IX in Fig. 7,

Fig. 10, in a larger scale, a partial section on line X—X of Fig. 2.

The carriage of the machine shown comprises a column 1, the foot of which is fixed to a rectangular base plate 2, and the head of which is provided with a handle 3 for guiding the machine in operation and for carrying same about. Plate 2, on its underside and in the front portion remote from column 1, comprises two guide rollers 5 mounted in ball-bearings 4 for facilitating the manual moving about of the machine on the work table 6. The stacked sheets of webs to be cut, e. g. of cloth and the like, are placed on the table 6.

An electric motor 7, having an upright shaft, is fixed to column 1, and an arm 8 and 9 each is fixed to the bottom and top, respectively, of the motor casing by means of a clamping ring. The said two arms are interconnected, through two screws 11, 12, by two juxtaposed bars 10 disposed parallel to the motor shaft. Top and bottom links 14 and 13 are pivotably connected to screw 12, 11 respectively, at one end, and to screw 16, 15 each at the end, which latter interconnect two bars forming an actuating bar 17. The said links 13, 14 thus are interposed between the two bars 10 on one hand, and between the two bars 17 on the other hand, all the said bars being parallel to each other. Top link 14 forms a bellcrank, the other arm of which is operatively connected by means of a link 18 to a crank pin 19 provided on the electric motor 7.

The reciprocating cutter 21 is secured to the lower-end portion of bar 17, between the two bars thereof, by means of the two screws 20, a filler 22 each being interposed between cutter 21 and the said bars (see Fig. 4). A stationary holding rail 23 is secured between the two bars 10 by means of two screws 24 and two fillers 25 which are disposed on either side of rail 23. Rail 23 is provided with forwardly converging opposite faces 23a. Stationary cutters 26 and 27 each is screw-fastened on one of the forwardly converging faces of the free end of rail 23. A space thus is provided between the stationary cutters 26 and 27 which are fixed to the machine, which space serves for receiving the reciprocable cutter 21. The latter laterally abuts against the stationary cutters 26, 27 and thus is guided thereby. All the three cutters 21, 26 and 27 are provided with triangular teeth. The teeth on the reciprocable cutter 21 are beveled to a knife edge 21' on alternate faces (Fig. 6), whereas the teeth on the stationary cutters 26 and 27 are beveled to a knife edge 26' and 27' respectively, on one and the same side of each (Figs. 7 and 8). The non-beveled or plane side of each cutter 26, 27 faces or abuts against the reciprocating cutter 21. As seen, in particular, from Fig. 7, teeth of the two stationary cutters 26 and 27 are staggered by half their pitch relative to each other. The foot portion of the cutting gear is accommodated, as shown in Figs. 1 and 2, in a longitudinal slot 28 provided in the longitudinal median plane of base plate 2 so as to guide same during operation.

As can be seen in Fig. 3 the teeth of knife 21 are only half as wide as those of cutters 26 and 27.

The machine is taken in operation by starting the electric motor 7, upon which the actuating rod 17 and the cutter 21 are reciprocated in a very flat circular arc from crank pin 19 and and through bell-crank 18 and link 13, as shown by the arrows in Fig. 1. A shearing action thus is set up by the co-action of the reciprocating cutter 21 with the fixed cutters 26, 27 abutting against each side thereof. In the case of stacked cloth or paper sheets or webs, the cutting or shearing action is still further improved by the arcuate or swinging movement of cutter 21 on the fixed screws 11 and 12. The machine is guided by means of handle 3 as required. Column 1 of the machine carriage or frame is of triangular cross-section (Fig. 2) and its vertical forward edge 1' is situated in the longitudinal median plane of base plate 2 and thus in line with the longitudinal slot 28 provided in the latter for guiding the foot portion of the cutting gear. The machine thus is literally plowed through the sheets or webs by means of the cutting gear and the forward edge 1' of column 1.

The machine shown has an outstanding cutting action, also in a tougher or more resistant material than fabric or paper.

The column 1 may be angularly adapted in elevation so as to project into the range of the holding rail 23 or the stationary cutters 26, 27 and to form beveled deflection faces for the stacked webs or sheets, adjacent to the respective sides. The column in this case is provided with a vertical groove for receiving the holding rail 23 and, if desired, also the cutters 26 and 27 which eventually also may be fixed directly to the said column.

I am aware that sheet-cutting machines having a traveling cutter-carriage and only one, i.e. a reciprocating cutter, are known in the art. Such known cutting machines usually possess a grinding or resharpening device for the cutter, which is to be cut in during operation of the machine. Such device, however, renders the machine structure comparatively complicated and further, has to be temporarily taken into operation at comparatively frequent intervals and thus is dangerous for the operator's hands.

In the machine according to my present invention, such grinding or resharpening device is replaced by the triple-blade cutting arrangement shown and described, in which the cutters continuously rub on each other during the operation of the machine, and the knife-edges always are keen.

What I claim as new and desire to secure by Letters Patent, is:

1. A cutting tool for textile and similar material, having a base plate and an upright support extending from said base plate and carrying an electric motor, a vertical holding rail mounted on said support, said base plate having a recess into which said rail extends, said holding rail having forwardly converging surfaces at its forward part, a toothed blade stationarily mounted on each of said converging surfaces with their teeth located forwardly beyond the front edge of said rail said toothed blades being displaced with reference to each other by a half tooth division, a thin, straight, toothed blade movably mounted between said two stationary toothed blades and guided thereby, which said movable blade having a tooth division only half as great as the other blades, an oscillating lever apparatus mounted on said support and drivingly connected with said electric motor to impart to the movable toothed blade an arcuate cutting-motion.

2. A cutting tool according to claim 1, and in which the movable toothed blade is carried by a guide-bar, and the oscillating lever apparatus comprises two levers connected with a guide bar, said levers being carried by bearings on the upright support.

3. A cutting tool according to claim 2 and in which all three knives have forwardly pointed teeth, and the cutting teeth of the two stationary knives on the side facing toward the movable blade are sharpened on their edges, while the cutting teeth of the movable knife are sharpened on both sides by rubbing against the teeth of the stationary blades during operation.

ALICE MISCHKE.

REFERENCES CITED

The following references are of record in the file of this patent:

UNITED STATES PATENTS

| Number | Name | Date |
| --- | --- | --- |
| 636,724 | Hacherelle | Nov. 7, 1899 |
| 1,136,842 | Siegal | Apr. 20, 1915 |
| 1,458,250 | Staudinger | June 12, 1923 |
| 1,806,116 | Peterson | May 19, 1931 |
| 1,832,993 | Masek | Nov. 24, 1931 |